US010521155B2

(12) United States Patent
Arasu

(10) Patent No.: US 10,521,155 B2
(45) Date of Patent: Dec. 31, 2019

(54) APPLICATION MANAGEMENT DATA

(71) Applicant: HEWLETT PACKARD ENTERPRISE DEVELOPMENT LP, Houston, TX (US)

(72) Inventor: Thirusenthilanda Arasu, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/756,232

(22) PCT Filed: Sep. 29, 2015

(86) PCT No.: PCT/US2015/052867
§ 371 (c)(1),
(2) Date: Feb. 28, 2018

(87) PCT Pub. No.: WO2017/058157
PCT Pub. Date: Apr. 6, 2017

(65) Prior Publication Data
US 2018/0246671 A1    Aug. 30, 2018

(51) Int. Cl.
*G06F 12/02* (2006.01)
*G06F 3/06* (2006.01)
(Continued)

(52) U.S. Cl.
CPC .......... *G06F 3/0659* (2013.01); *G06F 3/0604* (2013.01); *G06F 3/0644* (2013.01); *G06F 3/0673* (2013.01); *G06F 9/45533* (2013.01); *G06F 11/301* (2013.01); *G06F 11/302* (2013.01); *G06F 11/3495* (2013.01);
(Continued)

(58) Field of Classification Search
None
See application file for complete search history.

(56) References Cited

U.S. PATENT DOCUMENTS 7,636,699 B2    12/2009   Stanfill
8,176,491 B1    5/2012    Plummer et al.
(Continued)

FOREIGN PATENT DOCUMENTS

EP    1679602    7/2006

OTHER PUBLICATIONS

Kawachiya, K. et al., "Cloneable JVM: A New Approach to Start Isolated Java Applications Faster," Jun. 13-15, 2007, 11 pages, http://www.ittc.ku.edu/~kulkarni/teaching/archieve/EECS800-Spring-2008/cloneable_jvm.pdf.
(Continued)

*Primary Examiner* — Charles Rones
*Assistant Examiner* — Ryan Dare
(74) *Attorney, Agent, or Firm* — Hewlett Packard Enterprise Patent Department

(57) ABSTRACT

Examples disclosed herein relate, in one aspect, to a non-transitory machine-readable storage medium encoded with instructions executable by a processor of a computing device to cause the computing device to start a virtual machine process. The virtual machine process may obtain access to a shared memory segment accessible by a monitoring process, execute an application, and store in the shared memory segment management data associated with the application's execution.

20 Claims, 5 Drawing Sheets

(51) Int. Cl.
  *G06F 12/08* (2016.01)
  *G06F 9/455* (2018.01)
  *G06F 11/30* (2006.01)
  *G06F 11/34* (2006.01)

(52) U.S. Cl.
  CPC .......... *G06F 12/08* (2013.01); *G06F 9/45504* (2013.01); *G06F 2212/1041* (2013.01); *G06F 2212/656* (2013.01); *G06F 2212/657* (2013.01)

(56) References Cited

U.S. PATENT DOCUMENTS

| | | |
|---|---|---|
| 2006/0143595 A1 | 6/2006 | Dostert et al. |
| 2010/0023941 A1 | 1/2010 | Noboru et al. |
| 2012/0216185 A1 | 8/2012 | Dai et al. |
| 2013/0061241 A1 | 3/2013 | Gower et al. |
| 2014/0325492 A1 | 10/2014 | Stoodley et al. |
| 2015/0067293 A1* | 3/2015 | Flood ................ G06F 12/0269 711/170 |
| 2016/0048464 A1* | 2/2016 | Nakajima ........... G06F 12/1475 711/152 |

OTHER PUBLICATIONS

Azul Systems, "How is Zing Different From Traditional JVMS for Deploying Java Applications?" (Web Page), retrieved online Aug. 21, 4 pages, 2015, http://www.azulsystems.com/products/zing/faq.
International Search Report & Written Opinion received in PCT Application No. PCT/US2015/052867, dated Jun. 27, 2016, 12 pages.
Gusak, O., "Solving Java Memory Regressions with Zero Overhead & High Accuracy," Runtime Phases of a Typical Workload, Dec. 2, 2014, 6 pages, https://developer.salesforce.com/blogs/engineering/2014/12/solving-java-memory-regressions-high-accuracy-zero-overhead.html.
Bouchenak, S., "Zero Overhead Java Thread Migration," Sep. 2002, http://www.researchgate.net/publication/2535812_Zero_Overhead_Java_Thread_Migration.

* cited by examiner

APPLICATION MANAGEMENT DATA

BACKGROUND

Many applications developed today are intended to run on a number of various platforms. Developing and maintaining different application versions for different platforms may be a time and resource consuming task. Instead, a single application may be developed using a platform-independent programming language (e.g., Java) and executed using a virtual machine (e.g., a Java Virtual Machine) on any platform for which a virtual machine has been developed.

BRIEF DESCRIPTION OF THE DRAWINGS

The following detailed description references the drawings, wherein.

DETAILED DESCRIPTION

A developer of a platform-independent application may wish to monitor the application's performance during its execution by a virtual machine, for example, in order to identify and fix various errors, improve the application's performance, and so forth. For example, the developer may wish to monitor and analyze the application's memory usage, thread performance, etc. In order to collect such information, the user may run a monitoring application in parallel to the virtual machine, where running "in parallel" may include any type of concurrent execution, such as execution by a different processor or a different processor core, or execution by the same processor or processor core in a time-sharing manner. The virtual machine can create a separate thread that can collect the information and pass it to the monitoring application using sockets, signals, or other inter-process communication mechanisms. The separate thread, however, may consume memory, CPU, and other resources, all of which may affect the application's performance.

Examples disclosed herein describe, among other things, to a computing device comprising a memory and a processor. The processor may execute a virtual machine process and a monitoring process. The virtual machine process may obtain a shared memory segment in the memory, obtain an application for execution, execute the application, and store in the shared memory segment application management data associated with an application. The monitoring process may obtain access to the shared memory segment, and obtain at least one data portion of the management data from the shared memory segment. As a result, a monitoring tool may be able to monitor an application being executed by a virtual machine without affecting the application's performance.

Figure 1:
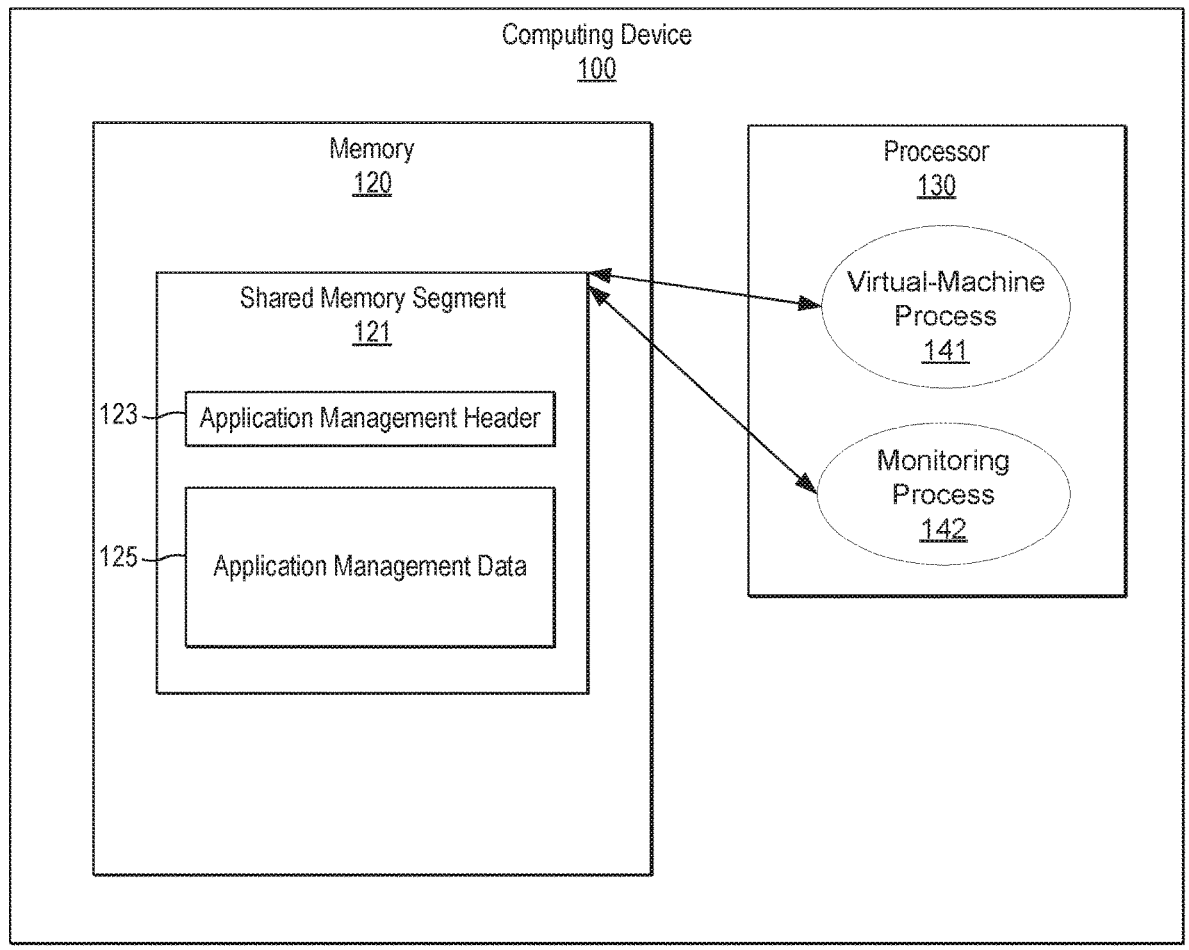
FIG. 1 is a block diagram of an example computing device.

FIG. 1 is a block diagram of an example computing device 100. Computing device 100 may be any type of electronic device or a combination of electronic devices. For example, computing device may include a desktop computer, a laptop computer, a tablet computer, a smartphone, a server (e.g., a NonStop server), a gaming console, a printing device, and so forth. In some examples, computing device 100 may include a memory 120, which may include any type of non-transitory memory that may include any combination of volatile and non-volatile memory. For example, memory 120 may include any combination of random-access memories (RAMs), read-only memories (ROMs), flash memories, hard drives, memristor-based memories, and the like.

Computing device 100 may also include a processor 130, which may include one or more processors or processor cores, such as central processing units (CPUs), semiconductor-based microprocessors, graphics processing units (GPUs), field-programmable gate arrays (FPGAs), or other electronic circuitry. In some examples, processor 130 may execute one or more processes, which may include, for example, processes associated with the operating system, such as processes running in kernel space, and processes associated with applications, such as processes running in user space. The operating system running on computing device 100 may be any type of an operating system, such as a Unix-based operating system (e.g., Linux, Solaris, etc.), a Microsoft Windows operating system (e.g., Windows 7, 8, 10, etc.), a proprietary operating system (e.g., NonStop OS) or any other type of an operating system supporting a parallel (e.g., time-shared) execution of two or more processes.

Upon receiving a request to run an application, the operating system may create a new process and assign to the new process a dedicated address space in memory 120. In some examples, the dedicated address space may be a virtual address space, where each virtual address is mapped to a certain physical address of memory 120. In some examples, in order to ensure data security, the operating system may prevent one process from accessing a physical address used by another process. Accordingly, in order to allow communication between processes, the operating system may allow any number of processes to access one or more common segments of memory 120, that is, segments that have been designated as "shared memory segments."

For example, upon a request from a process, the operating system may designate a new physical address in memory 120 as an address of a shared memory segment, assign an identifier to the shared memory segment, and map the physical address of the shared memory segment to a virtual address in the virtual address space of the process. Another process may then request access to the shared memory segment, e.g., by identifying the segment by its identifier. The operating system may then map the shared memory segment's physical address to a virtual address in the virtual address space of the other process, and provide the virtual address to the other process. As a result, the other process may access (e.g., read from and/or write to) the shared memory segment.

In some examples, the operating system may receive a request (e.g., a user-initiated request) to run an application. In some examples, the application may be a platform-independent application, such as a Java application. In response to the request, the operating system may create a virtual machine process 141, and instruct processor 130 to execute a virtual machine, such as a Java Virtual Machine ("JVM"), within virtual machine process 141. The virtual machine may, in some examples, obtain the application's instructions (e.g., the bytecode of the Java application), compile, link, and otherwise process the application, and cause processor 130 to execute the application (i.e., the application's instructions) within the same virtual machine process 141.

In some examples, the virtual machine may manage the application's execution, for example, by managing the application's memory consumption (e.g., allocate new memory, free unused memory, etc.), managing the application's various threads, loading and compiling new instructions (e.g., new classes), and performing any other management tasks. In some examples, the virtual machine may store and update application management data 125 associated with these various management tasks. As will be discussed in more detail below, application management data 125 may include various information about the application's memory usage, thread status, loaded classes, performance, and any other information used by the virtual machine for management of the application's execution.

Figure 2:
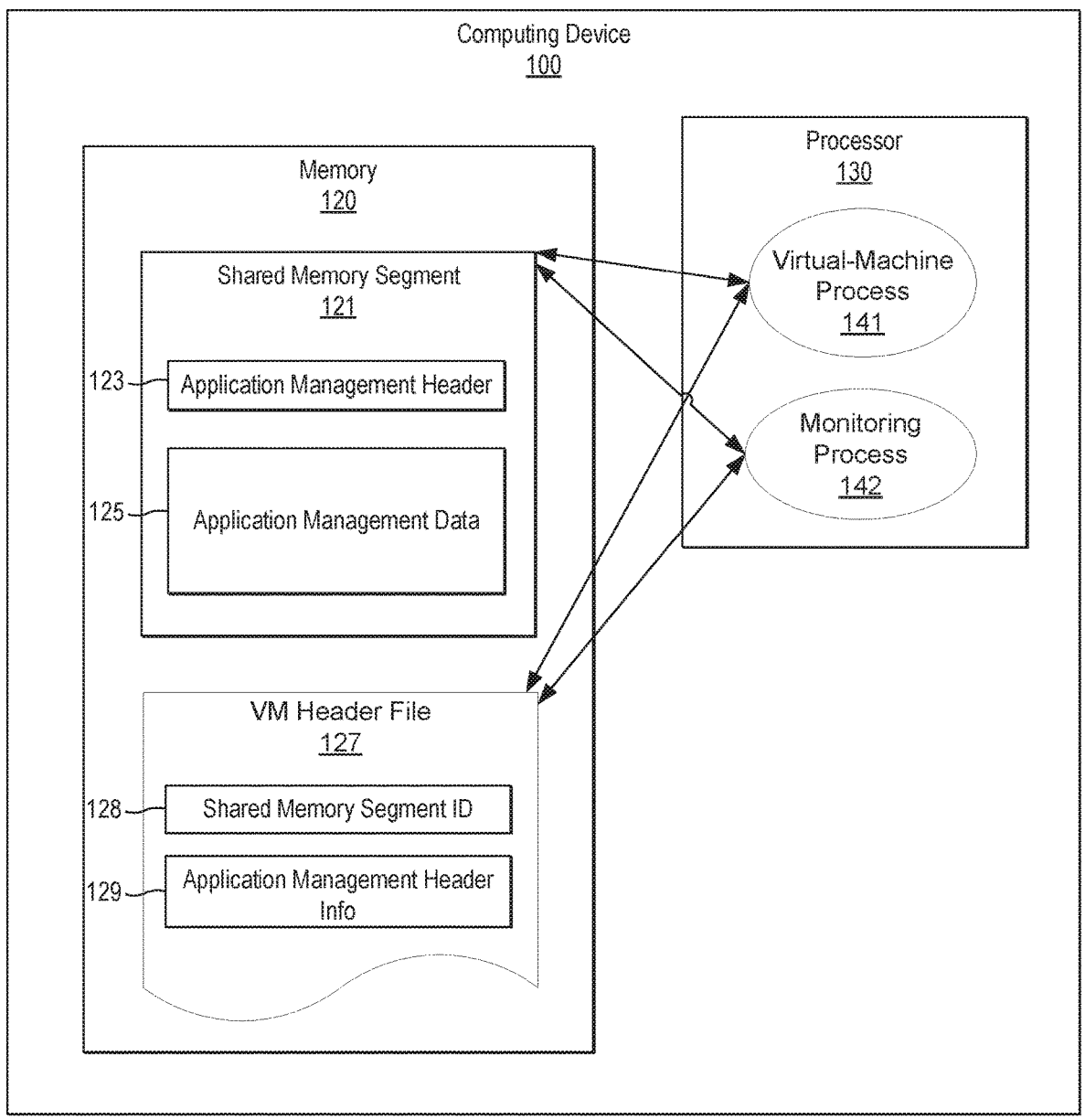
FIG. 2 is another block diagram of an example computing device.

In some examples, instead of storing application management data 125 in an address space dedicated to virtual machine process 141 (such space generally being inaccessible by other processes), the virtual machine may store application management data 125 in shared memory segment 121, thereby allowing access to management data 125 by other processes. For example, the virtual machine may request that the operating system create shared memory segment 121, that is, dedicate some unused space in memory 120 as shared memory segment 121. As mentioned above, shared memory segment 121 may be associated with and identified by a segment identifier. The segment identifier may be generated by the operating system, or it may be provided to the operating system by the virtual machine as part of the request to create the segment. In some examples, the virtual machine may obtain the segment identifier from a file, such as virtual machine header file 127 illustrated in FIG. 2 and discussed in more detail below.

In some examples, a user (e.g., a developer, a system administrator, etc.) may run a monitoring application for monitoring the execution (e.g., status, performance, etc.) of the application. The monitoring application may be a platform-specific application developed for the particular operating system and processor 130 of computing device 100, or it may be a platform-independent application such as a Java application performed by another instance of a virtual machine, such as another instance of a JVM. The monitoring application may be executed in a monitoring process 142 that may running in parallel with virtual machine process 142, e.g., either on a different core of processor 130, or on the same core in a time-sharing manner. In some examples, monitoring process 142 may run on a processor of another computing device that is communicatively coupled to computing device 100. As mentioned above, in some examples monitoring process 142 may be unable to access any memory space that was dedicated for virtual machine process 141. The monitoring application may, however, access application management data 125 stored in shared memory segment 121. The monitoring application may request access to shared memory segment 121, for example, by providing to the operating system the segment identifier of shared memory segment 121 and/or the process identifier of virtual machine process 141. In some examples, the combination of the segment identifier and the process identifier may uniquely identify shared memory segment 121 among any other shared memory segments.

In some examples, the monitoring application may provide for display (e.g., on a display coupled to computing device 100) a list of a number of (e.g., one or more) virtual machines running on computing device 100, and the process identifiers of the processes associated therewith. In these examples, the user may select one or more virtual machines (and applications associated therewith) whose performance the user would like to monitor. Thus, while some examples described herein discuss monitoring one application run by one virtual machine, it is appreciated that in other examples, the monitoring application may allow the user to simultaneously monitor a number of applications being executed by a number of virtual machines, where each virtual machine may store its application management data in a different shared memory segment in memory 120 or in a different portion of shared memory segment 121.

In some examples, the size and location of application management data 125 within shared memory segment 121 may dynamically change during the execution of the application. Accordingly, in some examples, the virtual machine may also store in shared memory segment 121 an application management header 123. Application management header 123 may be stored at a predefined offset within segment 121 (e.g., at the very beginning of segment 121) and may have a predefined structure and size. In some examples, the offset, structure, size, and any other parameters defining the application management header 123, collectively referred to as application management header info 129, may be stored in virtual-memory header file 127, or at another location accessible by monitoring process 142. As mentioned above, in some examples, virtual machine header file 127 may also store a shared memory segment identifier 128 identifying shared memory segment 121.

In some examples, the monitoring application may obtain application management header info 129, and based on application management header info 129, locate and determine the structure of application management header 123. Based on application management header 123, the monitoring application may find the application management data 125 within shared memory segment 121, and locate the various data portions within application management data 125.

Figure 3:
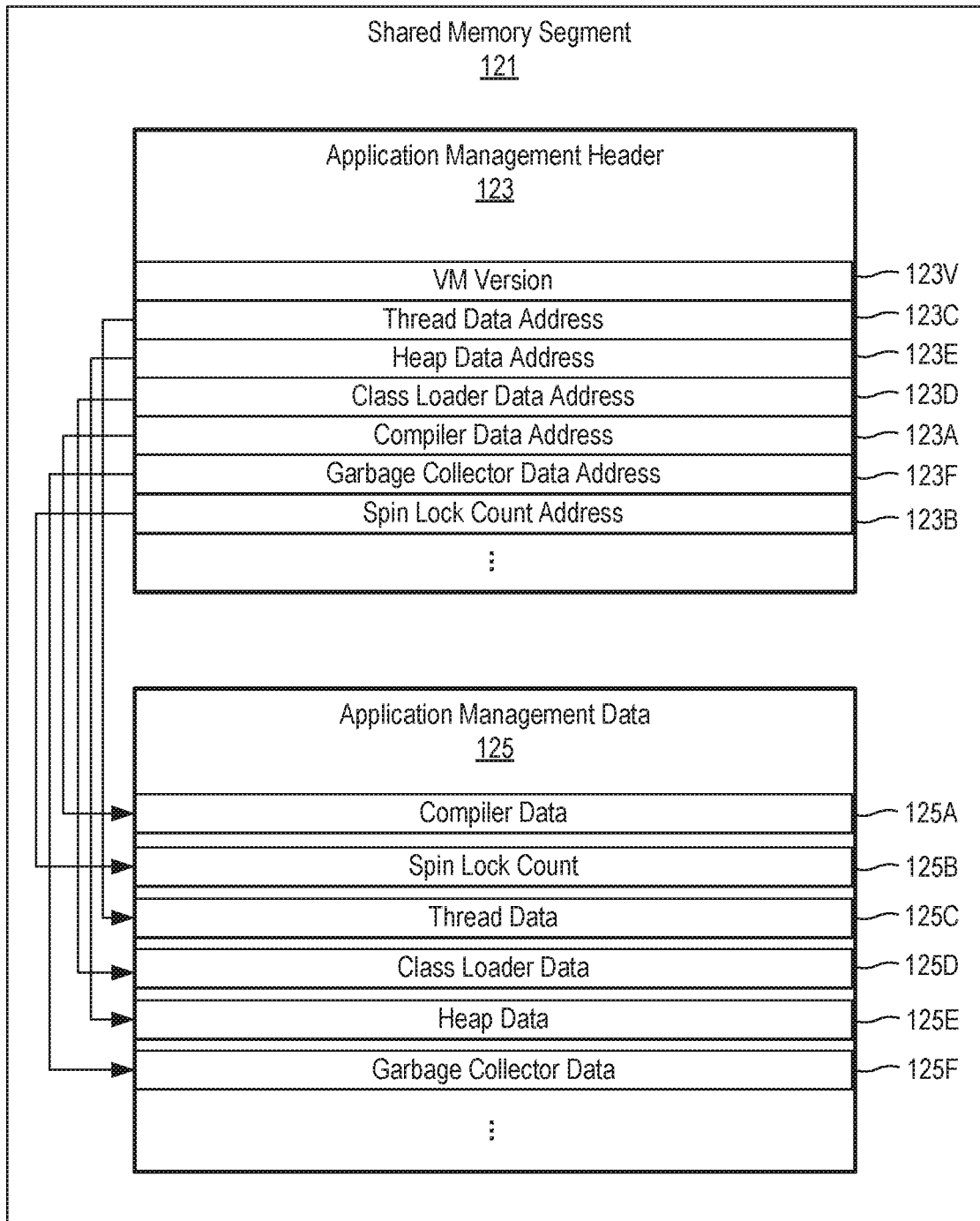
FIG. 3 is a block diagram of an example shared memory segment.

FIG. 3 illustrates an example application management data 125. As illustrated in this example, application management data 125 may include, for example, compiler data portion 125A indicating, e.g., the number of compilation tasks that have been or are being performed, the number of compilation tasks that have failed, the amount of time spent performing each compilation task, the name of the class and method of the last successful and/or failed compilation, etc. Application management data 125 may also include spin lock count data portion 125B indicating, e.g., the number of times the spin lock was acquired without contention, the number of times the spin lock was acquired with contention, the amount of time spent in waiting for the spin lock, the last owner of the spin lock, etc. Application management data 125 may also include thread data portion 125C including, e.g., a list of threads created by the application, the status or state of each thread (e.g., blocked, ready for execution, etc.), the number of times each thread has entered a blocked state, the amount of time that has elapsed since each thread entered blocked state, the total amount of time spent by the thread in the waiting state, the name of a lock to which the thread is waiting, etc.

Application management data 125 may also include class loader data portion 125D indicating, e.g., the number of classes that have been loaded and/or unloaded, the number of bytes that have been loaded and/or unloaded, the amount of time spent performing class loading and unloading operations. Application management data 125 may also include heap data portion 125E indicating, e.g., the size of the heap memory allocated for the application, the number of regions (e.g., permanent generation, young generation, etc.), the capacity and the current utilization of each region, etc. Application management data 125 may also include garbage-collector data portion 125F (if the virtual machine supports garbage collection). Garbage-collector data portion 125F may indicate, e.g., the number of minor garbage collections, the number of major garbage collections, the reason for the last garbage collection, the number of bytes reclaimed by garbage collections, the amount of time spent in garbage collections, etc. It is appreciated that application management data 125 may also include any other type of information related to the execution of the application by the virtual machine.

FIG. 3 also illustrates an example application management header 123. As illustrated in FIG. 3, application management header 123 may include a number of anchors or pointers 123A-123F indicating the addresses (and optionally the sizes) of the various data portions (e.g., 125A-125F) of application management data 125. Application management header 123 may also include a virtual machine version 123V of the virtual machine, or any other information associated with the virtual machine and/or application management data 125. As discussed above, the structure of application management header 123 may be a fixed and predefined structure that may be obtainable by the monitoring application, e.g., from virtual machine header file 127 or another source.

In some examples, after accessing shared memory segment 121 and finding a particular data portion (e.g., one of portions 125A-125F) of application management data 125, the monitoring application may further determine the structure of the particular portion. For example, the monitoring application may obtain a plurality of symbols defining the structures of the various portions of application management data 125. In some examples, the symbols may be stored in one or more header files associate with the virtual machine, such as virtual machine header file 127. In some examples, the storage location of the symbols (e.g., the name(s) and location(s) of file(s) storing the symbols) may depend on the version of the virtual machine, in which case the monitoring application may determine the location of the header file storing the symbols based on virtual machine version 123V.

In some examples, the monitoring application may periodically and/or non-periodically access application management data 125 or portions thereof, asynchronously and without affecting the performance of the virtual machine and the application. The monitoring application may be optionally process (e.g., filter, organize, statistically analyze, etc.) the obtained application management data 125, and present it to the user, e.g., by providing the data for display on a display coupled to computing device 100. Because some or all of the management data 125 may be continuously updated by the virtual machine, in some examples, the monitoring application may, periodically and/or upon request by the user, obtain updated application management data 125 and provide for updated data to the user. Based on application management data 125 and changes therein, the user may analyze performance of the application, identify and fix any potential issues, and otherwise evaluate the execution of the application.

Figure 4:
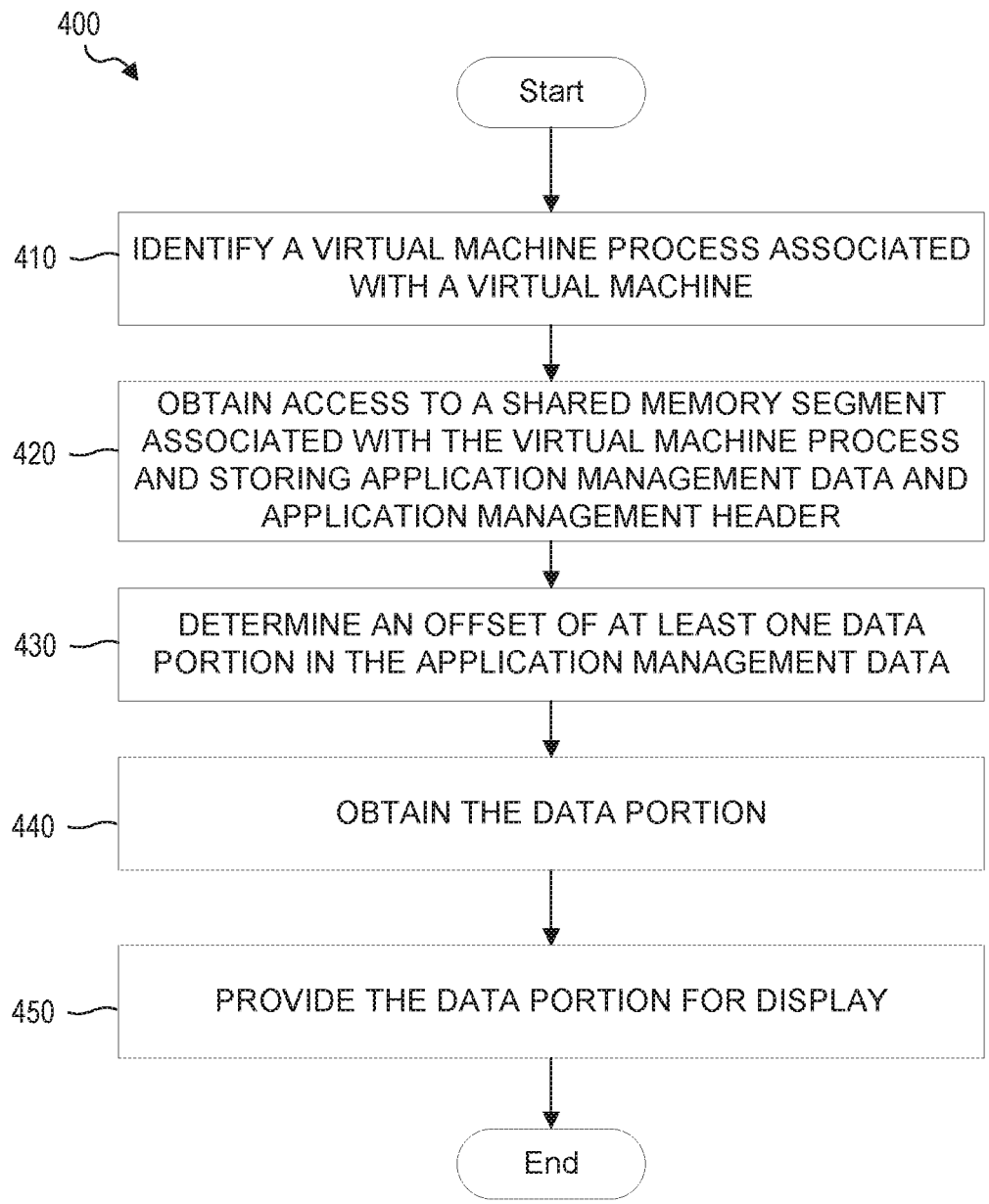
FIG. 4 is a flowchart of an example method for monitoring application management data of a virtual machine executing an application.

FIG. 4 is a flowchart of an example method 400 for monitoring application management data of a virtual machine executing an application on a computing device. Method 400 may be described below as being executed or performed by a computing device, such as computing device 100 of FIG. 1. Other suitable systems and/or computing devices may be used as well. Method 400 may be implemented in the form of executable instructions stored on at least one non-transitory machine-readable storage medium of the computing device and executed by at least one processor of the computing device. Alternatively or in addition, method 400 may be implemented in the form of electronic circuitry (e.g., hardware). In alternate examples of the present disclosure, one or more or blocks of method 400 may be executed substantially concurrently or in a different order than shown in FIG. 4. In alternate examples of the present disclosure, method 400 may include more or less blocks than are shown in FIG. 4. In some examples, one or more of the blocks of method 400 may, at certain times, be ongoing and/or may repeat.

At block 410, method 400 may identify a virtual machine process (e.g., 141) associated with the virtual machine. At block 420, the method may obtain, by a monitoring process (e.g., 142), access to a shared memory segment (e.g., 121) associated with the virtual machine process, where the shared memory segment may store the application management data (e.g., 125) and an application management header (e.g., 123) associated with the application management data, and where the application management data may include a plurality of data portions (e.g., 125A-125F). At block 430, the method may determine, by the monitoring process, an offset of at least one data portion of the plurality of data portions based on the header information. At block 440, the method may obtain the at least one data portion by the monitoring process. At block 450, the method may provide the at least one data portion for display. As discussed above, in some examples the method may also include determining a structure of the at least one data portion based on a plurality of symbols, and determining a storage location of the plurality of symbols based on a version of the virtual machine, where the version may be stored in the application management header.

Figure 5:
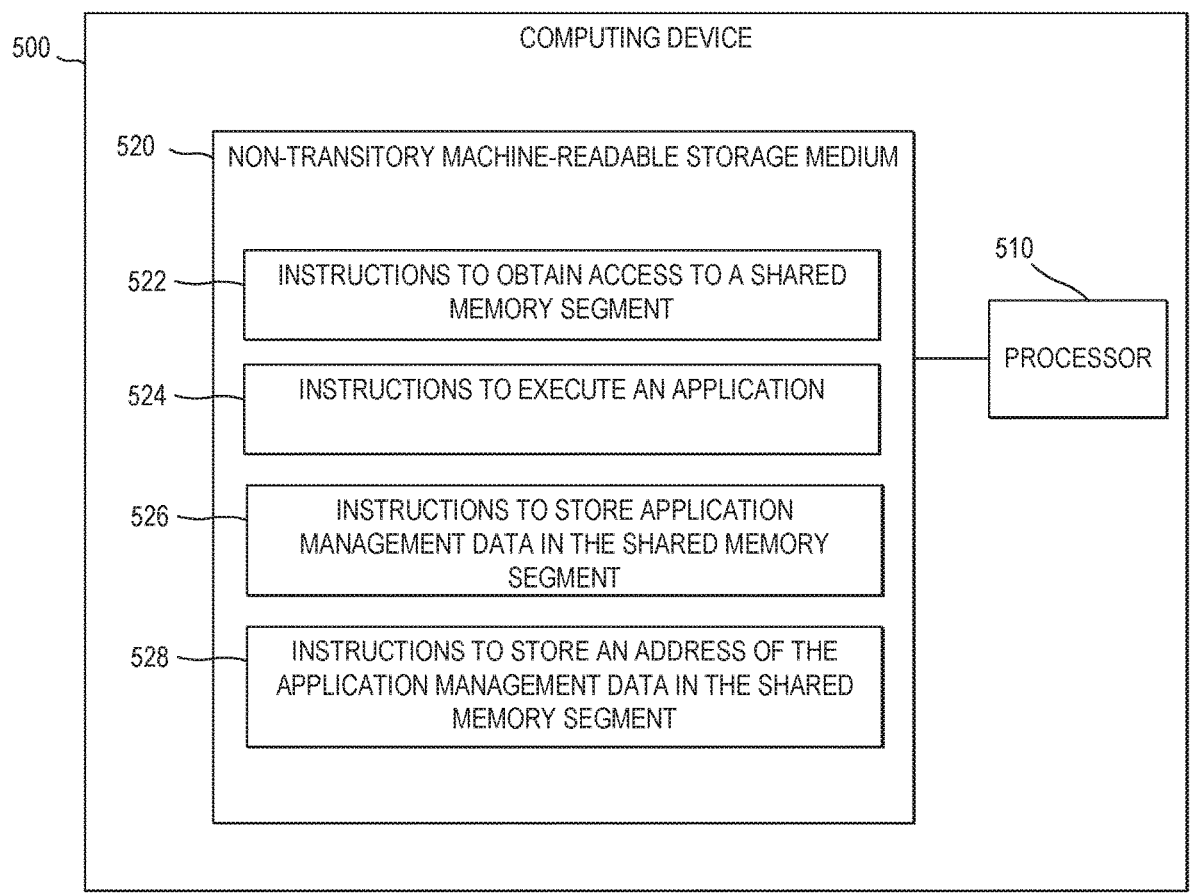
FIG. 5 is another block diagram of an example computing device.

FIG. 5 is a block diagram of an example computing device 500. Computing device 500 may be similar to computing device 100 of FIG. 1. In the example of FIG. 5, computing device 500 includes a processor 510 and a non-transitory machine-readable storage medium 520. Although the following descriptions refer to a single processor and a single machine-readable storage medium, it is appreciated that multiple processors and multiple machine-readable storage mediums may be anticipated in other examples. In such other examples, the instructions may be distributed (e.g., stored) across multiple machine-readable storage mediums and the instructions may be distributed (e.g., executed by) across multiple processors.

Processor 510 may include one or more central processing units (CPUs), processor cores, microprocessors, and/or other hardware devices suitable for retrieval and execution of instructions stored in non-transitory machine-readable storage medium 520. In the particular example shown in FIG. 5, processor 510 may fetch, decode, and execute instructions 522, 524, 526, 528, and 530, or any other instructions (not shown for brevity). As an alternative or in addition to retrieving and executing instructions, processor 510 may include one or more electronic circuits comprising a number of electronic components for performing the functionality of one or more of the instructions in machine-readable storage medium 520. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Non-transitory machine-readable storage medium 520 may be any electronic, magnetic, optical, or other physical storage device that stores executable instructions. Thus, medium 520 may be, for example, Random Access Memory (RAM), an Electrically-Erasable Programmable Read-Only Memory (EEPROM), a storage drive, an optical disc, and the like. Medium 520 may be disposed within computing device 500, as shown in FIG. 5. In this situation, the executable instructions may be "installed" on computing device 500. Alternatively, medium 520 may be a portable, external or remote storage medium, for example, that allows computing device 510 to download the instructions from the portable/external/remote storage medium. In this situation, the executable instructions may be part of an "installation package". As described herein, medium 520 may be encoded with executable instructions for generating report(s).

Referring to FIG. 5, instructions 522, 524, 526, and 528 may be executed by a virtual machine process. Specifically, instructions 522, when executed by a processor (e.g., 510), may cause a computing device (e.g., 500) to obtain access to a shared memory segment accessible by a monitoring process running in parallel with the virtual machine process. Instructions 524, when executed by the processor, may cause the computing device to execute an application. Executing the application may include, for example, obtaining instructions (e.g., bytecode) of a platform-independent application such as Java application, compiling, linking, and otherwise processing the instructions to convert them into machine code compatible with processor 510, and causing computing device 500 to execute the application by causing processor 510 to execute the instructions.

Instructions 526, when executed by the processor, may cause the computing device to store at a first address of the shared memory segment management data associated with the application's execution, where the management data includes at least thread data indicating status of a set of threads created by the application, and/or heap data indicating the application's memory usage. As discussed above, in some examples, instructions 526 may be executed on a continuous basis, i.e., the management data may be continuously updated. Instructions 528, when executed by the processor, may cause the computing device to store the first address at a predefined offset within the shared memory segment.

What is claimed is:

1. A non-transitory machine-readable storage medium encoded with instructions executable by a processor of a computing device to cause the computing device to:
   start a virtual machine process;
   start a monitoring process running in parallel with the virtual machine process;
   designate a shared memory segment to be accessible by the monitoring process and the virtual machine process;
   assign a segment identifier to the shared memory segment;
   create a virtual machine header file outside the shared memory segment to be accessible by the monitoring process and the virtual machine process;
   store the segment identifier in the virtual machine header file;
   execute an application on a virtual machine within the virtual machine process;
   use the virtual machine to manage the execution of the application and generate associated management data;
   store the management data in the shared memory segment,
   wherein the management data comprises at least one of: memory usage,
   thread, loaded classes, and performance;
   store an application management header in the shared memory segment; and
   store a parameter defining the application management header in the virtual machine header file.

2. The non-transitory machine-readable storage medium of claim 1, wherein the management data further comprises at least one of compiler data and spin-lock count.

3. The non-transitory machine-readable storage medium of claim 1, wherein the instructions of the application comprise platform-independent instructions.

4. The non-transitory machine-readable storage medium of claim 1, further comprising instructions to:
   update the application management header in the shared memory segment and application management data header information in the virtual machine header file responsive to a change in size or location of the application management data.

5. The non-transitory machine-readable storage medium of claim 1, wherein the storage of the management data in the shared memory segment does not affect performance of the application.

6. A method for monitoring application management data of a virtual machine executing an application on a computing device, the method comprising:
   identifying a virtual machine process associated with the virtual machine;
   obtaining, from a virtual machine header file associated with the virtual machine process, a segment identifier of a shared memory segment associated with the virtual machine process, wherein the shared memory segment stores the application management data and an application management header associated with the application management data, and wherein the application management data comprises a plurality of data portions;
   locating the shared memory segment based on the segment identifier;
   obtaining application management header information from the virtual machine header file;
   locating the application management header in the shared memory segment based on the application management header information;
   locating at least one data portion of the plurality of data portions based on the application management header;
   obtaining the at least one data portion; and
   providing the at least one data portion for display.

7. The method of claim 6, wherein the plurality of data portions includes at least one of: a thread data portion, a compiler data portion, a spin-lock count data portion, and a class loader data portion.

8. The method of claim 6, further comprising determining a structure of the at least one data portion based on a plurality of symbols stored in the virtual machine header file.

9. The method of claim 6, wherein the application management header comprises a version of the virtual machine, and wherein the method further comprises determining a storage location of the plurality of symbols based on the version.

10. The method of claim 6, wherein identifying the virtual machine process comprises providing for display identifiers of a plurality of processes being executed by the computing device, and obtaining a selection input indicating one of the identifiers.

11. The method of claim 6, further comprising determining a structure of the application management header based on the application management header information.

12. The method of claim 6, further comprising periodically or non-periodically accessing a portion of the application management data.

13. The method of claim 12, wherein the periodically or non-periodically accessing a portion of the application management data is synchronous and does not affect performance of an application running on a virtual machine within the virtual machine process.

14. The method of claim 6, wherein the at least one data portion changes in size during the execution of the application.

15. The method of claim 6, wherein the at least one data portion changes in location during the execution of the application.

16. A computing device comprising a memory and a processor, wherein the processor is to execute a virtual machine process and a monitoring process, wherein:
the virtual machine process is to:
 obtain a shared memory segment in the memory,
 obtain a virtual machine header file comprising a segment identifier for the shared memory segment and located outside the shared memory segment;
 obtain an application for execution,
 execute the application;
 store, in the shared memory segment, an application management header and application management data associated with the application;
 store, in the virtual machine header file, application management header information;
and the monitoring process is to:
 obtain access to the virtual machine header file;
 identify the shared memory segment based on the segment identifier;
 obtain access to the shared memory segment;
 locate the application management header based on the application management header information, and
 obtain at least one data portion of the management data from the shared memory segment based on the application management header.

17. The computing device of claim 16, wherein the application management data comprises at least one of: a thread data portion, a compiler data portion, a spin-lock count data portion, and a class loader data portion.

18. The computing device of claim 16, wherein the monitoring process is further to determine a structure of the at least one data portion based on a plurality of symbols stored in the memory.

19. The computing device of claim 18, wherein the plurality of symbols is stored in the virtual machine header file.

20. The computing device of claim 16, wherein the virtual machine comprises a Java Virtual Machine, and wherein the application comprises a Java application.

* * * * *